Sept. 7, 1965
J. A. MILNES
3,204,460
SYSTEM FOR INDICATING THE LIQUID LEVEL IN A
CONTINUOUS-CASTING MOLD OR THE LIKE
Filed Aug. 13, 1962
4 Sheets-Sheet 1
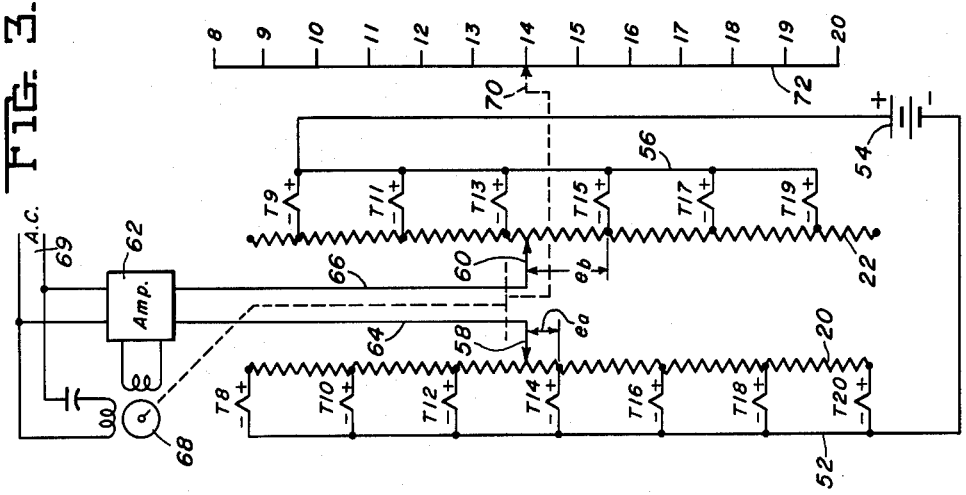
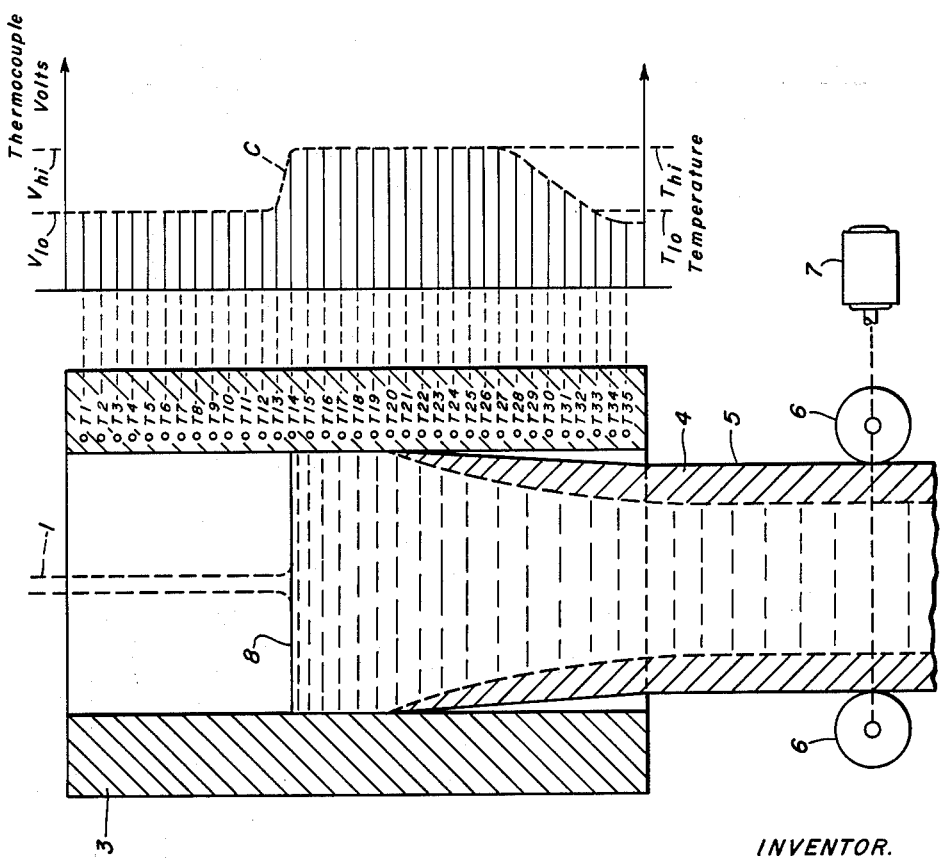
INVENTOR.
JAMES A. MILNES
By Donald H. Dalton
Attorney Sept. 7, 1965  J. A. MILNES  3,204,460
SYSTEM FOR INDICATING THE LIQUID LEVEL IN A
CONTINUOUS-CASTING MOLD OR THE LIKE
Filed Aug. 13, 1962  4 Sheets-Sheet 2
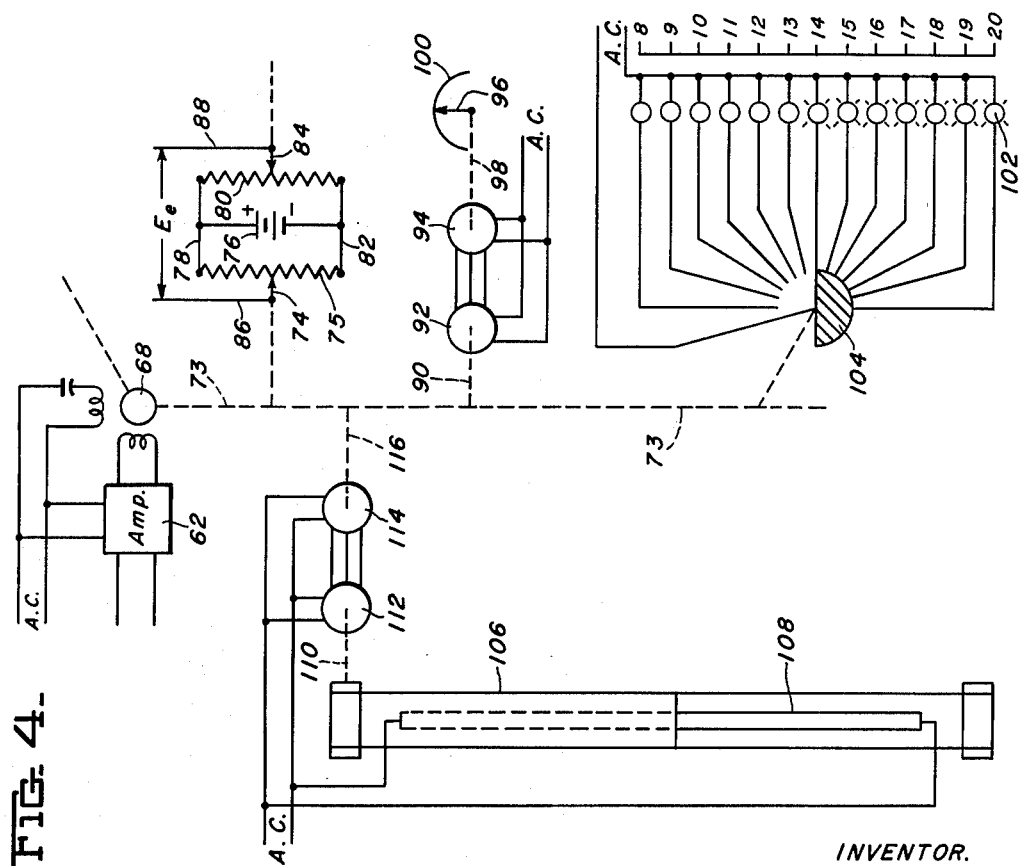
INVENTOR.
JAMES A. MILNES
By Donald G. Dalton
Attorney Sept. 7, 1965  J. A. MILNES  3,204,460
SYSTEM FOR INDICATING THE LIQUID LEVEL IN A
CONTINUOUS-CASTING MOLD OR THE LIKE
Filed Aug. 13, 1962  4 Sheets-Sheet 3
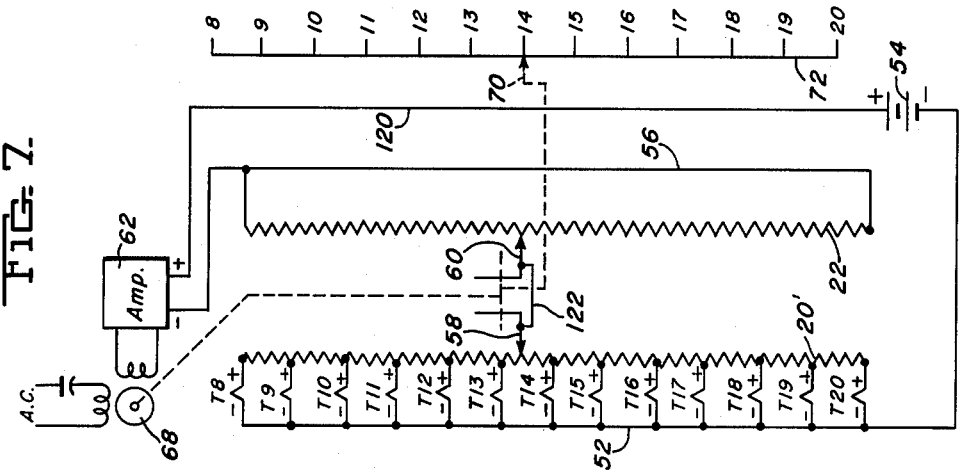
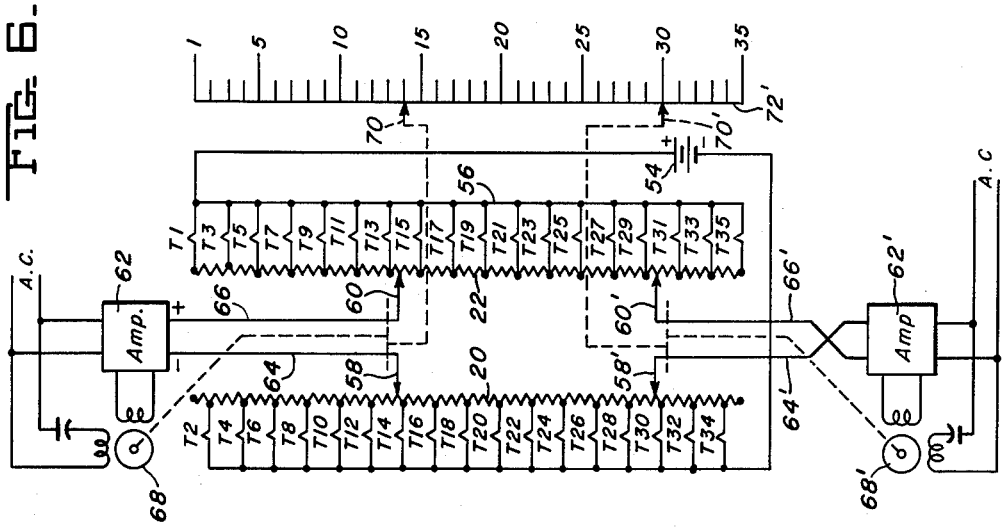
INVENTOR.
JAMES A. MILNES
By Donald G. Dalton
Attorney Sept. 7, 1965
J. A. MILNES
3,204,460
SYSTEM FOR INDICATING THE LIQUID LEVEL IN A
CONTINUOUS-CASTING MOLD OR THE LIKE
Filed Aug. 13, 1962
4 Sheets-Sheet 4
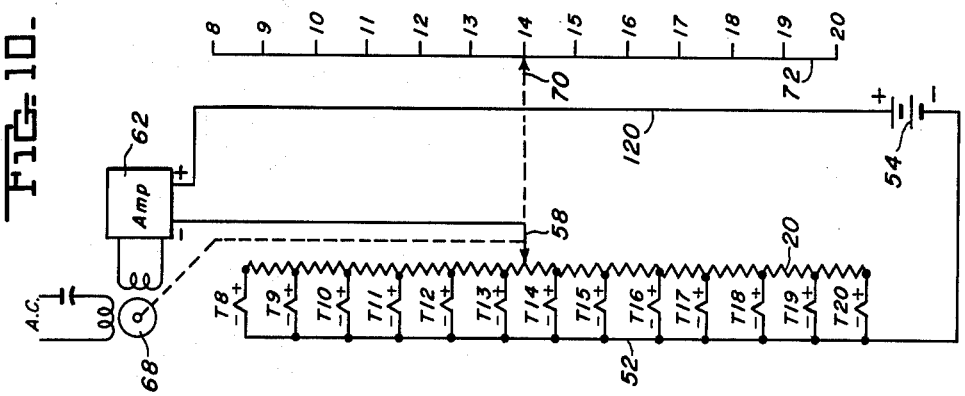
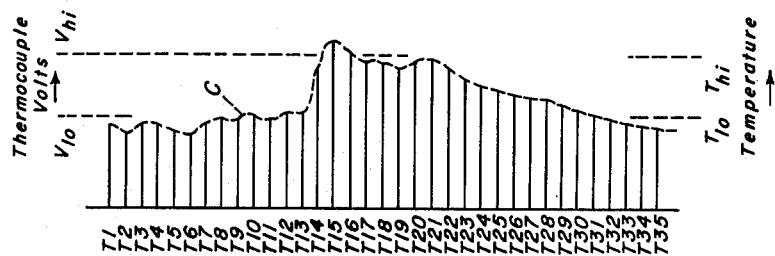
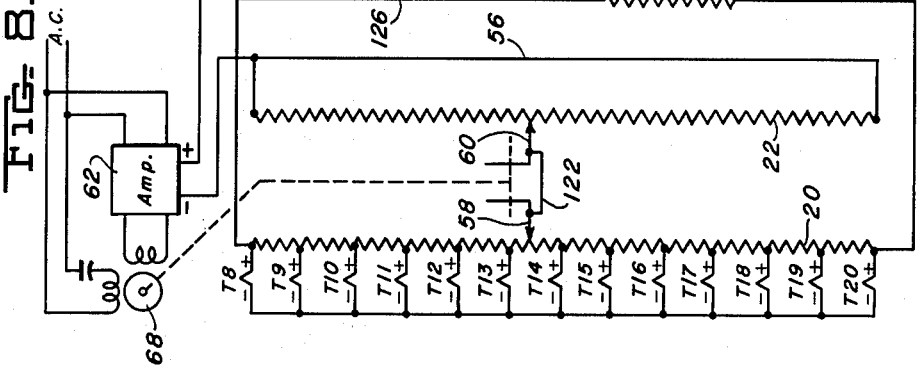
INVENTOR.
JAMES A. MILNES
By Donald G. Dalton
Attorney 
United States Patent Office 3,204,460  
Patented Sept. 7, 1965

3,204,460  
SYSTEM FOR INDICATING THE LIQUID LEVEL IN A CONTINUOUS-CASTING MOLD OR THE LIKE  
James A. Milnes, Monroeville, Pa., assignor to United States Steel Corporation, a corporation of New Jersey  
Filed Aug. 13, 1962, Ser. No. 216,400  
5 Claims. (Cl. 73—295)

This invention relates to a system for indicating the level of a liquid in a receiver, container or holder and, in particular, to a system for indicating the height of molten metal in a continuous-casting mold.

The invention is based on the fact that a sharp change in the temperature of a heated member occurs at the surface of a pool in which it is immersed or in the wall of a container of molten metal, in going up the member or container wall from below the level of the pool surface to a point above it or vice versa. I utilize this temperature change to control a self-balancing bridge comprising a resistor provided with a traveling contact so that the contact moves to and remains in a position corresponding to the neighborhood of the sharp temperature change, as indicated by thermocouples spaced vertically along the mold or heated member. I connect these thermocouples to the resistor and apply a voltage indicative of the degree of unbalance of the bridge, after amplification, to a motor for actuating the contact back and forth along the resistor. As a result, the contact is automatically moved to a position between the adjacent thermocouples generating maximum and minimum voltages, i.e., the point where the temperature change between adjacent thermocouples is a maximum. The position of the contact or an indicator moving with it thus reveals the height of the liquid level.

The invention may be applied to an unheated liquid by providing a vertical conductor in the tank containing it, with thermocouples spaced therealong and connected to a bridge as aforesaid. By heating the vertical conductor electrically, it will exhibit a sharp change of temperature at the level of the liquid.

A complete understanding of the invention may be obtained from the following detailed description and explanation which refer to the accompanying drawings illustrating the present preferred embodiment. In the drawings:

FIGURE 1 is a diagrammatic vertical section through a continuous-casting mold incorporating thermocouples according to my invention;

FIGURE 2 is a graph showing the voltages generated by the thermocouples;

FIGURE 3 is a circuit diagram of the bridge;

FIGURE 4 is a similar diagram showing a number of optional auxiliaries useful in conjunction with the system of FIGURE 3;

FIGURE 5 is a diagram similar to FIGURE 3 showing a modification;

FIGURES 6, 7 and 8 are similar diagrams showing further modifications;

FIGURE 9 is a graph similar to FIGURE 2 showing the condition for which the system of FIGURE 8 is intended; and FIGURE 10 is a circuit diagram of another modified bridge arrangement having a single slide-wire resistor.

It is well known that the temperature gradient encountered going up or down the wall of a continuous-casting mold is determined by the liquid level in the mold. Above the liquid level, heat is transferred from the metal to the walls by radiation. Below the liquid level, heat is transferred directly from the metal to the walls by conduction. Although there is some transfer of heat along the mold walls, the spot temperature changes from about 80% to 20% of its maximum value adjacent the liquid level in a vertical distance along the mold wall about 1.5 times the transverse cross-sectional distance through the mold wall to the point of temperature measurement within the wall. A relatively steep temperature gradient therefore exists at the liquid level which may be detected by the difference between a fixed voltage and the sum of the outputs of thermocouples imbedded in the mold wall immediately above and below the actual liquid level.

The system of my invention utilizes the sum of the voltage outputs of these thermocouples to provide a determination of the height of the liquid level in the mold. To obtain a marked change in the outputs of the thermocouples immediately above and below the liquid level, they should be located about ¼" from the inside surface of the mold wall and spaced about 1" apart along the portion of the mold height defined by the minimum and maximum liquid levels. Under these conditions, the liquid level may be determined within limits of about ±½".

Referring now in detail to the drawings, FIGURE 1 is a diagrammatic view showing a portion of a typical continuous-casting operation wherein a stream of molten metal 1 is teemed from a ladle or other source into a tubular mold 3. As the metal cools in the mold, a skin or shell 4 of solidified metal is formed on the descending column 5, within which is contained the still liquid metal. The metal column 5 leaving the mold is engaged on opposite sides by pinch rolls 6, driven at a preselected speed by a motor 7, which serve to continuously withdraw it for delivery to subsequent processing equipment. The apparatus briefly described thus far is conventional and does not constitute any part of my invention.

According to my invention, thermocouples T1 through T35 are spaced vertically along the wall of mold 3 at equal intervals of about 1" and at a distance of about ¼" from the inside surface of the wall. When the liquid level 8 is at the location shown in FIGURE 1, which is opposite the thermocouple T14, the individual output voltages of the thermocouples T1 through T35 will be represented by the corresponding horizontal lines in the graph of FIGURE 2. As hereinafter described, my system locates the point where the maximum difference between the voltages of adjacent thermocouples occurs. The liquid level in the mold will be within the region between these two thermocouples. Since the position of each thermocouple with respect to the mold is known, the level of the liquid standing in the mold is readily determined.

One embodiment of the system of my invention is shown in FIGURE 3. In explaining this embodiment, it will be assumed for simplicity that the liquid level always stands within ±6 thermocouples from a specific level, for example between thermocouples T8 and T20 in FIGURE 3. These thermocouples, encased in a suitable electrical-insulating material, are embedded in the wall of mold 3 as shown in FIGURE 1. The system includes two linear slide-wire resistors 20 and 22 of equal length and resistance, in spaced parallel relation.

The positive terminals of thermocouples T8, T10, T12, T14, T16, T18, and T20 are connected to the resistor 20 at equal spaced intervals. The thermocouple T8 is connected to the upper end of the resistor 20 and the thermocouple T20 is connected to the lower end of this resistor. The negative terminals of the thermocouples T8, T10, T12, T14, T16, T18, and T20 are connected to the conductor 52, which is in turn connected to the negative terminal of a direct-current source 54, which may be a battery.

The negative terminals of thermocouples T9, T11, T13, T15, T17, and T19 are connected to the resistor 22 at equal spaced intervals, and their respective positions on this resistor coincide with the midpoints between corresponding adjacent thermocouples connected to the resistor 20. The positive terminals of the thermocouples T9, T11, T13, T15, T17, and T19 are connected to a conductor 56, which is in turn connected to the positive terminal of source 54.

Traveling contacts 58 and 60 are provided for sliding engagement with resistors 20 and 22, respectively, and are connected to the input terminals of servo amplifier 62 of any conventional type by conductors 64 and 66, respectively. The output terminals of amplifier 62 are connected to an alternating-current reversible motor 68 which is also connected to a current source 69. The shaft of motor 68 is mechanically connected to the contacts 58 and 60. These contacts are thus driven upwardly or downwardly along resistors 20 and 22, depending on the direction of rotation of the motor 68, which is governed by the polarity of the input to amplifier 62. A pointer 70 is connected to and moves with the contacts 58 and 60 along a suitably marked scale 72.

The voltage of source 54 may conveniently be chosen to equal the sum of the voltages produced by a thermocouple above the liquid level and a thermocouple below the liquid level, so the system described operates in a manner to be explained shortly, to move the pointer 70 to a position on the scale 72 between the two thermocouples indicating the actual liquid level in the mold. If the liquid level changes, the position of the pointer 70 will change correspondingly to provide a continuous indication of the liquid level on the scale 72, so long as the liquid level does not vary beyond the thermocouples T8 through T20.

Assuming first that the liquid metal in mold 3 falls below the level near T13 and T14, e.g., to a point between thermocouples T16 and T17, leaving contacts 58 and 60 engaging resistors 20 and 22 at a location above the new liquid level, conductor 64 will be made negative with respect to conductor 66. This results from the fact that the thermocouples T13 and T14 adjacent contacts 58 and 60 are both in an area of low temperature, with the result that their voltage outputs are both low. Since the voltage of source 54 is chosen to be equal to the sum of the high- and low-voltage thermocouple outputs, corresponding to temperatures near the liquid and away from the liquid, the system is now unbalanced. The resulting potential applied across the conductors 64 and 66 causes the amplifier 62 to deliver output and operate the motor 68 in such direction that contacts 58 and 60 move downwardly along the resistors 20 and 22 until they reach the position of the new liquid level, e.g., that in which contact 58 is between the thermocouples T16 and T18 and contact 60 is between thermocouples T15 and T17.

After the fall of the molten metal, thermocouples T15 and T16 are above the new level thereof and therefore become relatively cool while thermocouples T17 and T18 are still below the liquid level and therefore remain very hot. When the contacts 58 and 60 reach a position between thermocouples T16 and T17, they are subject to the sum of the voltages from the thermocouples above and below the liquid level having the maximum and minimum voltage outputs. Since the external voltage of source 54 is chosen to equal the sum of these voltages, the system is thus balanced and no voltage exists across conductors 64 and 66. Under this condition, the motor 68 stops and contacts 58 and 60 remain in the described position. Since the pointer 70 is attached to the moves with the contacts, its new position along the scale 72 indicates the liquid level then existing in the mold.

If the metal rises above its previous level, contacts 58 and 60 are left positioned along the resistors 20 and 22 at a location below the actual liquid level, adjacent to thermocouples all having a high voltage output. Hence, conductor 64 will be positive with respect to the conductor 66. In this instance, the output of amplifier 62 will operate motor 68 in such direction as to move the contacts upwardly along the resistors until they reach a position of balance as described above. When this balanced voltage condition is restored between conductors 64 and 66, the motor 68 will stop.

It may be desirable automatically to control the liquid level so as to maintain it at a desired height rather than manually controlling it in accordance with an indication of the type provided by the embodiment of FIGURE 3. To accomplish this, it is only necessary to provide an electrical signal proportional to the height of the liquid level in the mold. This signal may be used to control either the pouring rate of the metal introduced to the mold or the speed of the pinch rolls 6 governing the rate at which the solidified metal column is withdrawn from the mold. In either case, a signal representing the magnitude and the direction of deviation of the measured liquid level from that desired must be made available for utilization by appropriate controllers. One arrangement for developing a control signal of this nature from the system shown in FIGURE 3 is illustrated in FIGURE 4.

As shown at the upper right in FIGURE 4, an additional shaft 73 is driven by the shaft of motor 68. Slide-wire resistors 75 and 80 have movable contacts 74 and 84 and are so designed that these contacts will be at the upper ends of resistors 75 and 80 when contacts 58 and 60 are positioned at the upper ends of resistors 20 and 22, and that contacts 74 and 84 will be moved to the lower ends of resistors 75 and 80 when the contacts 58 and 60 are at the lower ends of resistors 20 and 22. A battery 76 is connected across the upper and lower ends of resistors 75 and 80. Contact 84 is manually adjustable along the resistor 80 and represents a manually set point or the desired operating level of the liquid metal in the mold.

Contact 74 is connected to shaft 73 and therefore its position along resistor 75 will correspond to the position of contacts 58 and 60 along the resistors 20 and 22. The position of contact 74 will depend on the actual height of the liquid level in the mold. When the contact 74 moves along resistor 75 below the setting of the manually adjustable contact 84 on resistor 80, this means that the actual liquid level in the mold is below the desired and preselected level, as established by the manual positioning of contact 84. Conductors 86 and 88 are connected to the contacts 74 and 84, respectively, and, under such conditions, conductor 88 will be positive with respect to conductor 86. The magnitude of the potential is proportional to the difference between the positions of contacts 74 and 84 along their respective resistors and consequently the magnitude of the difference between the actual liquid level, as represented by the position of contact 74, and the desired and preselected liquid level, as represented by the position of contact 84.

When contact 74 engages resistor 75 at a point above the position of contact 84 on resistor 80, this means that the actual liquid level in the mold is above the desired and preselected level, as established by the manual adjustment of contact 84. Under such conditions, conductor 88 will be negative relative to conductor 86 and the magnitude of the potential will be governed by the difference between the positions of contacts 74 and 84 and, consequently, the difference between the actual liquid level and the desired liquid level. When the contacts 74 and 84 are at the same points along their respective resistors, the actual liquid level corresponds with the desired liquid level, and in this instance no potential difference exists across the conductors 86 and 88. Thus, by means of the circuit shown at the upper right in FIGURE 4, a voltage is developed between conductors 88 and 86 whenever the actual liquid level does not correspond with the desired preselected liquid level. The polarity of this voltage indicates the direction of deviation of the actual liquid level from the desired liquid level, and the magnitude of the potential difference indicates the extent or the magnitude of the deviation. The signal so developed may be applied to any control system for regulating the withdrawal rate of the metal column or the pouring rate of the liquid metal into the mold, such as that described in Ratcliffe Patent 2,746,105.

If it is desired to obtain an indication of the actual liquid level in the mold at a point remote from the system shown in FIGURE 3, an arrangement such as that shown at middle right in FIGURE 4 may be used. A shaft 90 of a "Selsyn" transmitter 92 is connected to the shaft 73 of the motor 68. "Selsyn" repeaters 94 may be located wherever desired, with an indicator pointer 96 connected to their shafts 98. The pointer moves over a scale 100 and the actual liquid level may be read directly from the scale. Telemetric systems wherein the shaft of the "Selsyn" repeater follows and corresponds to the angular displacement of the "Selsyn" transmitter are well known in the art and require no further description.

A further means for giving an indication of the actual liquid level is shown at the lower right in FIGURE 4. In this arrangement, a vertical line of lamps 102 provides a visual indication. Each lamp corresponds to a specific point along the height of the mold. A contact disc 104 is connected to the shaft 73 of motor 68 and is driven thereby to close successively the circuits from a current source to individual lamps 102 in accordance with the operation of motor 68. As previously explained this depends on the actual liquid level in the mold. Hence, the number of lamps upwardly from the bottom of the line, energized at any time, indicates the portion of the height of the mold that is filled with metal.

Still a different type of visual indication of the liquid level in the mold is shown at the lower left in FIGURE 4. A shutter 106 is mounted in front of a tubular lamp 108 and is driven by shaft 110 of a "Selsyn" receiver 112, which is electrically connected to a "Selsyn" transmitter 114. The shaft of transmitter 114 is connected to the shaft 73 of motor 68. The portion of the length of lamp 108 uncovered by the shutter 106 corresponds to the height of the liquid column in the mold.

In the system shown in FIGURE 3, the contacts 58 and 60 come to rest at a point along resistors 20 and 22 corresponding to the actual height of the liquid level within the mold. For this purpose, the external source 54 of balancing voltage is required. This voltage is usually chosen to equal the sum of the voltages produced by a thermocouple above the liquid level and a thermocouple below the liquid level. The temperatures existing within the mold wall may change to different levels, however, as a result of a drastic increase in the casting rate or in the temperature of the molten metal being poured. It is thus possible that the voltage of the source may be of such value that a balance of the system of FIGURE 3 can not be achieved. A modification of the system of FIGURE 3 which avoids this difficulty is illustrated in FIGURE 5.

As shown in FIGURE 5, a conductor 118 has one end connected to the resistor 22 at the junction of thermocouple T19 and its other end to the resistor 20 at the junction of thermocouple T8. This connection provides a variable voltage between conductors 52 and 56, the value of which is always equal to the sum of the voltages of a thermocouple located above the liquid level (T8) and a thermocouple located below the liquid level (T19). This total voltage varies because any change, such as an increase or decrease in the casting rate which would increase or decrease the temperature of the mold and thereby affect the outputs of the thermocouples, will also increase or decrease proportionately the sum of the voltages produced by thermocouples T8 and T20 which make up the total voltage between conductors 52 and 56. The operation of this modified arrangement is otherwise identical to that described for the arrangement of FIGURE 3, with respect to obtaining an indication of the liquid level.

In some continuous-casting installations, means are provided to permit changing of the inside dimensions of the mold along its length to conform to the shrinkage of the metal as it cools on descending through the mold. This arrangement enhances cooling of the metal by maintaining close contact between the metal and the surfaces of the mold walls. In order to maintain such contact by adjustment of the mold, it is desirable to know the elevation along the mold wall of the horizontal plane where the metal shrinks to the extent that it begins to pull away from and thus be out of contact with the mold wall. The mold may then be suitably readjusted prior to the start of a new casting operation.

An indication of the level of this pull-away plane in addition to an indication of the liquid level in the mold is provided by the embodiment of the invention shown in FIGURE 6. This arrangement is identical to that shown in FIGURE 3 as far as concerns the provision of an indication of the actual liquid level in the mold. In order to provide simultaneously an indication of the level of pull-away plane, I add to the system of FIGURE 3 slide contacts 58' and 60' connected to conductors 64' and 66', respectively. Conductors 64' and 66' are connected to amplifier 62' in reversed relation so that motor 68' will drive the contacts 58' and 60' downwardly when they are above the pull-away plane and upwardly when they are below the pull-away plane, until balance is achieved at a position between the thermocouples above and below the actual pull-away plane.

The pointer 70' attached to the slide contacts 58' and 60' indicates the actual pull-away point on the scale 72'. For convenience, a standard dual-pen recorder may be used to provide a continuous, simultaneous indication of the actual liquid level and the pull-away plane. Obviously, it will be necessary, in the system of FIGURE 6, to provide thermocouples over a greater distance along the mold wall than in the embodiment of FIGURE 3. For a three-foot mold, 35 thermocouples spaced 1 inch apart would extend along 34 inches of the mold height. Hence, in the embodiment of FIGURE 6, thermocouples T1 through T35 are provided along the length of the mold, as also shown in FIGURE 1.

FIGURE 7 shows a system in which all thermocouples T8 through T20 are connected to one tapped resistor 20'. With this system, all the thermocouples can have one lead of the same polarity and thus need not be insulated from the mold wall. This in turn permits the metal of the mold wall to act as one terminal of the thermocouples, and a wire of a different metal welded or brazed to the mold wall may serve as the second element of the thermocouples. In this case, the voltage of the external direct-current source 54 is chosen to equal one-half the sum of the high and low voltages produced by thermocouples below and above the actual liquid level, respectively. The positive terminal of voltage source 54 is connected to the amplifier 62 through a conductor 120, and the negative terminal is connected to conductor 52. The contacts 58 and 60 are series connected by a conductor 122, and the resistor 22 is connected at its upper end to the amplifier 62. The operation of this embodiment to achieve an indication of the actual liquid level is identical to that of the system shown in FIGURE 3.

If the vertical temperature gradient in the mold wall is irregular as shown in FIGURE 9, the modified system of FIGURE 8 has an advantage. With this system, balance may be achieved at a position of contacts 58 and 60 on the resistors 20 and 22, representative of the actual liquid level, even if the longitudinal temperature gradient in the mold is similar to that of FIGURE 9. In this embodiment, variable resistor 124 is connected to the upper and lower ends of resistor 20 through conductors 126 and 128, respectively. The resistor 22 and the contact 130 of resistor 124 are connected to the input terminals of amplifier 62. The contacts 58 and 60 will thus come to rest at a point along the resistor 20 at which the voltage between them is sufficient to balance the voltage at the contact 130 on resistor 124.

The voltage selected at contact 130 may be of any value between the low-temperature value and the high-temperature value. Resistor 124 is actually a potentiometer and the net voltage applied thereto is the difference between the voltage of thermocouple T8 and that of thermocouple T20. If contact 130 is at the midpoint on resistor 124, conditions would be the same as in FIGURE 7, i.e., the voltage between conductor 52 and contact 130 would be half the sum of the thermocouple voltages just mentioned. The operating voltage need not be restricted, however, to a value equal to half the sum of these two values, as previously indicated. The effect of this modification is to provide for unequal responses of the individual thermocouples or to provide for unequal heat-transfer characteristics along the length of the mold. The balancing motor 68 will drive contacts 58 and 60 to a point near that corresponding to the liquid level but not necessarily exactly half way between two adjacent thermocouples, as in the system of FIGURE 3.

The circuits shown in FIGURES 3, 5 and 6–8 include a self-balancing bridge including two parallel resistors because a bridge of this type is a standard commercial article. The bridge may, however, embody only one resistor as illustrated in FIGURE 10. As there shown, all the thermocouples from T8 through T20 are connected to resistor 20 and voltage source 54 is connected to amplifier 62 in series opposition to the voltages generated by the thermocouples, respectively. The operation of the system embodying a single-resistor bridge is identical to that of the systems shown in FIGURES 3 and 7. The voltage of source 54 in FIGURE 10 is chosen to equal one-half the sum of the high and low voltages generated by the adjacent thermocouples below and above the liquid level.

If it is desired to show the height of the surface of an unheated liquid in a container, a conducting member such as a rod, having thermocouples spaced therealong and connected as in FIGURES 3, 5, 6–8 and 10, is placed in the liquid and heated by electric-resistance heating. A sharp difference in the temperature of adjacent points on the member above and below the liquid level will result which will serve to give an indication by any of the systems shown herein.

Although I have disclosed herein the preferred embodiment of my invention, I intend to cover as well any change or modification therein which may be made without departing from the spirit and scope of the invention.

I claim:

1. In a system for indicating the height of the liquid level in a container wherein the temperature of the liquid differs from the ambient temperature above the liquid, a means for obtaining a continuous voltage profile analog to the temperature profile within said container comprising:
    (a) a set of thermocouples, each thermocouple of said set being thermally coupled to a separate one of a set of points spaced vertically within said container, and
    (b) a slide-wire resistor,
    (c) each one of said set of thermocouples being connected to a separate point along said resistor, the set of said points along said resistor being spaced to correspond to said set of points within said container, whereby a continuous voltage profile is obtained along said slide-wire resistor that is an analog to the vertical temperature profile within said container.

2. A system for indicating the position along a pre-determined path of a pre-determined temperature in a container having a variation of temperature along said path, comprising:
    (a) a set of thermocouples, each thermocouple of said set being thermally in contact with a separate one of a set of points spaced along said path,
    (b) a slide-wire resistor,
    (c) each one of said set of thermocouples being connected to a separate point along said resistor, the set of said points along said resistor being spaced to correspond to the spacing between said set of points along said path,
    whereby a continuous voltage profile is obtained along said slide-wire resistor that is an analog to the temperature profile along said path,
    (d) a contact electrically engaging said resistor and movable along said resistor,
    (e) means to establish a voltage equal in magnitude to the voltage along said voltage profile that corresponds to a temperature equal to said pre-determined temperature,
    (f) means to establish a control signal having a magnitude and polarity that corresponds to the difference in voltage between said established voltage and the voltage at said contact, and
    (g) motor means connected to drive said contact and responsive to said control signal to drive said contact to a point along said resistor that equals said established voltage,
    whereby the rest position of said contact along said resistor corresponds to the position of said pre-determined temperature along said path.

3. A system for indicating the height of the liquid level in a container wherein the temperature of said liquid differs from the ambient temperature above said surface, comprising:
    (a) a set of thermocouples, each thermocouple of said set being thermally in contact with a separate one of a set of points spaced vertically along the interior of said container,
    (b) a slide-wire resistor,
    (c) each one of said set of thermocouples being connected to a separate point along said resistor, the set of said points along said resistor being spaced to correspond to the spacing between said set of points spaced vertically within said container,
    whereby a continuous voltage profile is obtained along said slide-wire resistor that is an analog to the vertical temperature profile within said container,
    (d) a contact electrically engaging said resistor and movable along said resistor,
    (e) means to establish a voltage equal in magnitude to the point along said voltage profile that corresponds to a point substantially at the liquid level,
    (f) means to establish a control signal having a magnitude and polarity that corresponds to the difference in voltage between said established voltage and the voltage at said contact, and
    (g) motor means connected to drive said contact and responsive to said control signal to drive said contact to a point along said voltage profile that equals said established voltage,
    whereby the position of said contact along said voltage profile will correspond to the position of said liquid level in said container.

4. A system for indicating the height, in an erect tubular continuous-casting mold, of a plane at which a marked change in the temperature of the mold wall occurs, comprising:
    (a) a set of thermocouples, each thermocouple of said set being in thermal contact with a separate one of a set of points spaced vertically within said container,
    (b) a slide-wire resistor,
    (c) each one of said set of thermocouples being connected to a separate point along said resistor, the set of said points along said resistor being spaced to correspond to the spacing between said set of points spaced vertically within said container,
    whereby a continuous voltage profile is obtained along said slide-wire resistor that is an analog to the vertical temperature profile within said container, (d) a contact electrically engaging said resistor and movable along said resistor, (e) means to establish a voltage equal in magnitude to the point along said voltage profile that corresponds to the plane at which said marked change in temperature occurs, (f) means to establish a control signal having a magnitude and polarity that corresponds to the difference in voltage between said established voltage and the voltage and the voltage at said contact, and (g) motor means connected to drive said contact and responsive to said control signal to drive said contact to a point along said voltage profile that equals said established voltage, whereby the rest position of said contact along said voltage profile will correspond to the position of said plane along said temperature profile.

5. A system for indicating the height of the liquid level in a container wherein the temperature of said liquid differs from the ambient temperature above said surface, comprising:

(a) a first set of thermocouples, each thermocouple of said first set being in thermal contact with a separate one of a first set of points spaced vertically within said container, (b) a first slide-wire resistor, (c) the negative terminal of each one of said first set of thermocouples being connected to a separate point along said first resistor, the set of said points along said first resistor being spaced to correspond to the spacing between said first set of points within said container, (d) a second set of thermocouples, each thermocouple of said second set being in thermal contact with a separate one of a second set of points spaced vertically within said container, (e) a second slide-wire resistor, (f) the positive terminal of each one of said second set of thermocouples being connected to a separate point along said second resistor, the set of said points along said second resistor being spaced to correspond to the spacing between said second set of points within said container, whereby a continuous voltage profile is obtained along each of said slide-wire resistors that is an analog to the vertical temperature profile within said container, (g) means to bias one of said set of thermocouples relative to the other of said set of thermocouples whereby the voltage along said first voltage profile at said liquid level will equal the voltage along said second voltage profile at said liquid level, (h) a first contact electrically engaging said first resistor and movable along said first resistor, (i) a second contact electrically engaging said second resistor and movable along said second resistor, (j) said contacts being mechanically ganged together so that both of said contacts are electrically connected to comparable positions along the respective voltage profiles provided by the respective ones of said slide-wire resistors, and (k) motor means connected to drive said contacts and responsive to the voltage difference between said contacts to drive said contacts to a position along said resistors where the voltage at one of said contacts will equal the voltage at the other of said contacts, whereby the rest position of said contacts along said resistors will correspond to the liquid level.

References Cited by the Examiner
UNITED STATES PATENTS

| | | | |
|---|---|---|---|
| 1,833,112 | 11/31 | Harrison | 73—841 X |
| 2,279,043 | 4/42 | Harrington | 73—341 X |
| 2,611,812 | 9/52 | Hornfleck | 340—187 |
| 2,702,476 | 2/55 | DeBoisblanc | 73—295 |
| 2,743,492 | 5/56 | Easton | 22—79 |
| 2,863,115 | 12/58 | Jackson | 324—99 X |

OTHER REFERENCES

Fribance, A. E.: Industrial Instrumentation Fundamentals, N.Y., McGraw-Hill, 1961, page 378.

ISAAC LISANN, *Primary Examiner.*

UNITED STATES PATENT OFFICE
CERTIFICATE OF CORRECTION

Patent No. 3,204,460 September 7, 1965

James A. Milnes

It is hereby certified that error appears in the above numbered patent requiring correction and that the said Letters Patent should read as corrected below.

Column 3, line 65, for "the", second occurrence, read -- and --; column 9, line 10, strike out "and the voltage --; column 10, line 39, for "1961" read -- 1962 --.

Signed and sealed this 29th day of March 1966.

(SEAL)
Attest:

ERNEST W. SWIDER
Attesting Officer

EDWARD J. BRENNER
Commissioner of Patents